United States Patent
Lauterbach et al.

(10) Patent No.: US 6,734,386 B1
(45) Date of Patent: May 11, 2004

(54) METHOD FOR RENDERING PVDF MEMBRANE HYDROPHILIC

(75) Inventors: Siegfried Lauterbach, Ojai, CA (US); Christopher A. Meissner, Camarillo, CA (US)

(73) Assignee: Meissner Filtration Products, Inc., Camarillo, CA (US)

( * ) Notice: Subject to any disclaimer, the term of this patent is extended or adjusted under 35 U.S.C. 154(b) by 22 days.

(21) Appl. No.: 10/072,467

(22) Filed: Feb. 5, 2002

Related U.S. Application Data

(60) Provisional application No. 60/324,306, filed on Sep. 24, 2001.

(51) Int. Cl.[7] .............................................. B23K 10/00
(52) U.S. Cl. ............................ 219/121.59; 219/121.41; 219/121.52; 210/500.36; 428/137
(58) Field of Search ..................... 219/121.59, 121.41, 219/121.4, 121.52; 428/143, 137, 149, 164, 147; 210/490, 500.36, 500.35

(56) References Cited

U.S. PATENT DOCUMENTS

| 3,801,404 A | 4/1974 | Druin et al. |
| 4,200,110 A | 4/1980 | Peterson et al. |
| 4,505,799 A | 3/1985 | Baxter |
| 4,534,356 A | 8/1985 | Papadakis |
| 4,536,274 A | 8/1985 | Papadakis et al. |
| 4,615,340 A | 10/1986 | Cronenberg et al. |
| 4,717,479 A | 1/1988 | Itoh et al. |
| 4,885,077 A | 12/1989 | Karakelle et al. |
| 5,282,965 A | 2/1994 | Urairi et al. |
| 6,193,077 B1 * | 2/2001 | Witham et al. ............. 210/490 |
| 6,310,309 B1 * | 10/2001 | Ager et al. ............. 209/127.1 |
| 6,352,758 B1 * | 3/2002 | Huang et al. ............. 428/143 |

FOREIGN PATENT DOCUMENTS

| GB | 2 058 802 A1 | 4/1981 |

OTHER PUBLICATIONS

Zdrahala, Richard J. et al., "Hydrophilic Membranes for Biomedical Use. Dimensionally–Stable Membranes Based on Porous Polypropylene.", The 1987 International Congress on Membranes and Membrane Processes, Jun. 8–12, 1987 (4 pages), ANA Hotel Tokyo, Japan.

* cited by examiner

*Primary Examiner*—Mark Paschall
(74) *Attorney, Agent, or Firm*—Christie, Parker & Hale, LLP

(57) ABSTRACT

A microporous PVDF membrane is rendered hydrophilic without making it brittle or lowering its heat resistance by exposing the membrane to a plasma under controlled conditions. Specifically, a microporous PVDF membrane is first coated with an appropriate monomer. After the monomer dries, the membrane is exposed to the plasma. Any remaining uncured monomer on the membrane is removed. Thereafter, the membrane is pleated and incorporated in a filter cartridge.

12 Claims, 4 Drawing Sheets

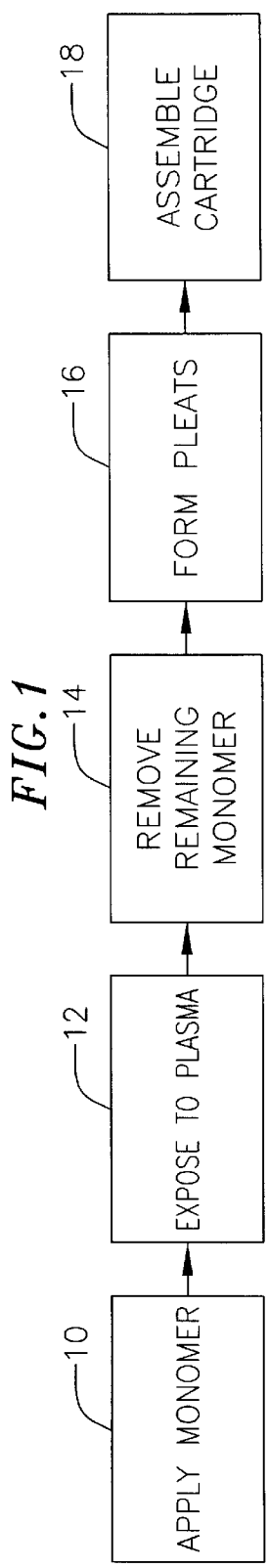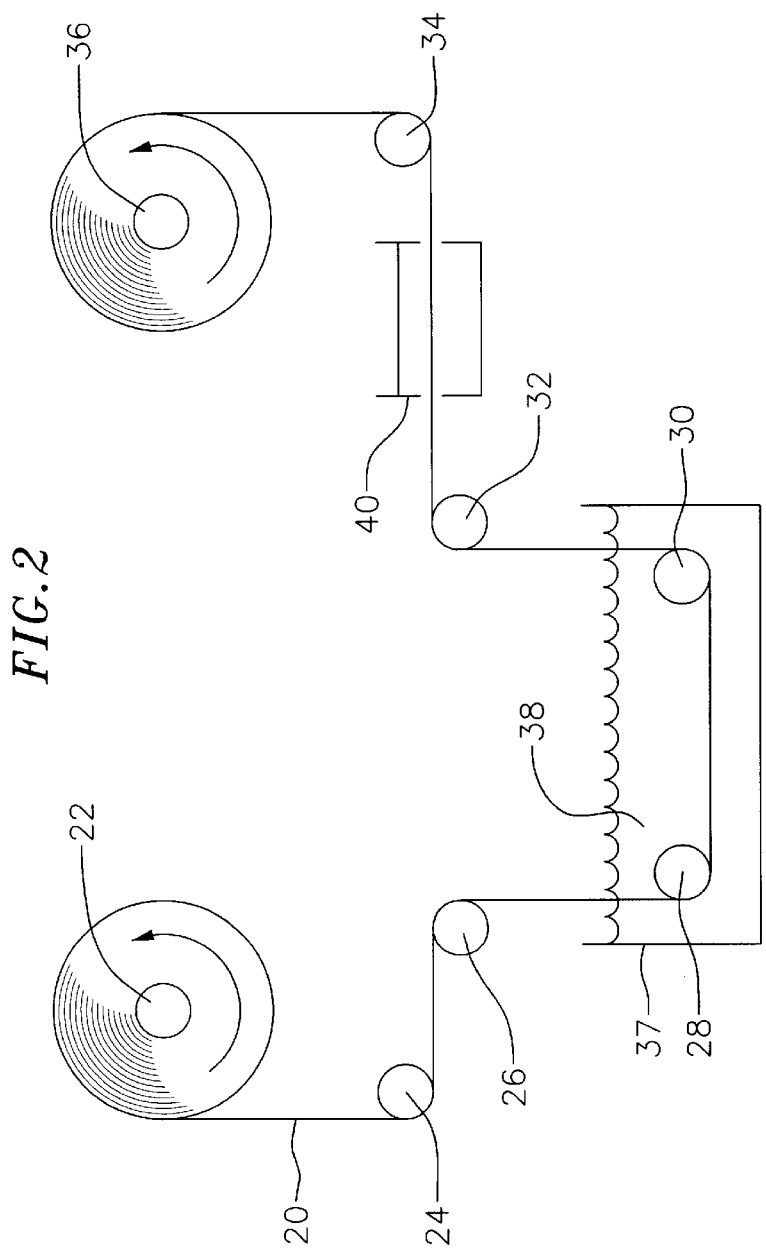

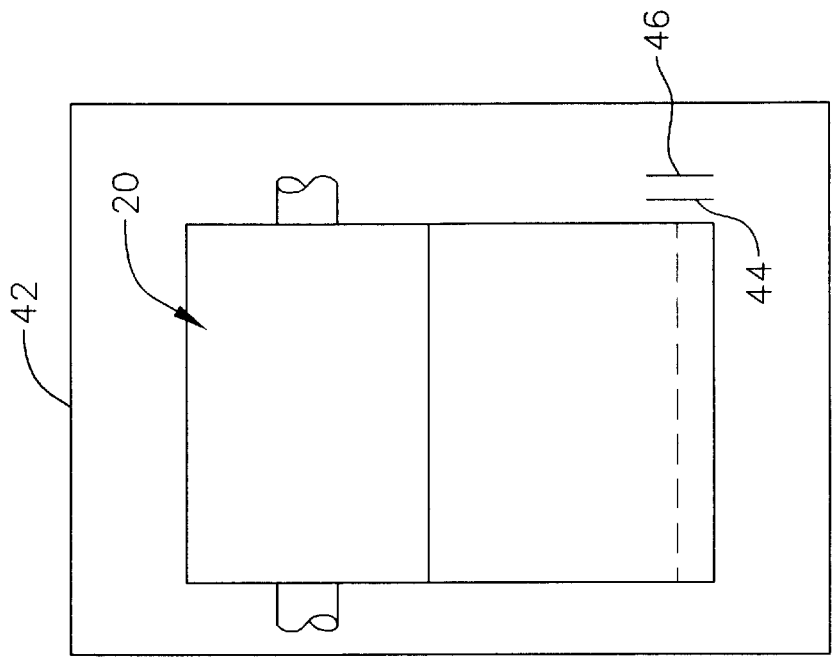
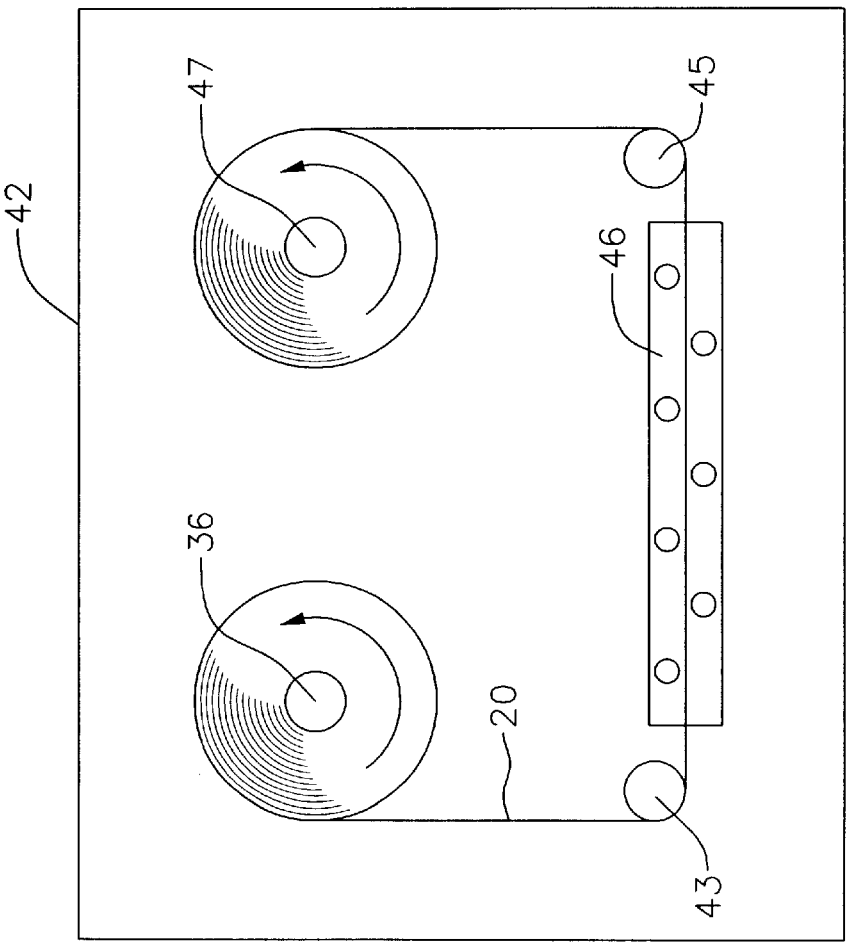

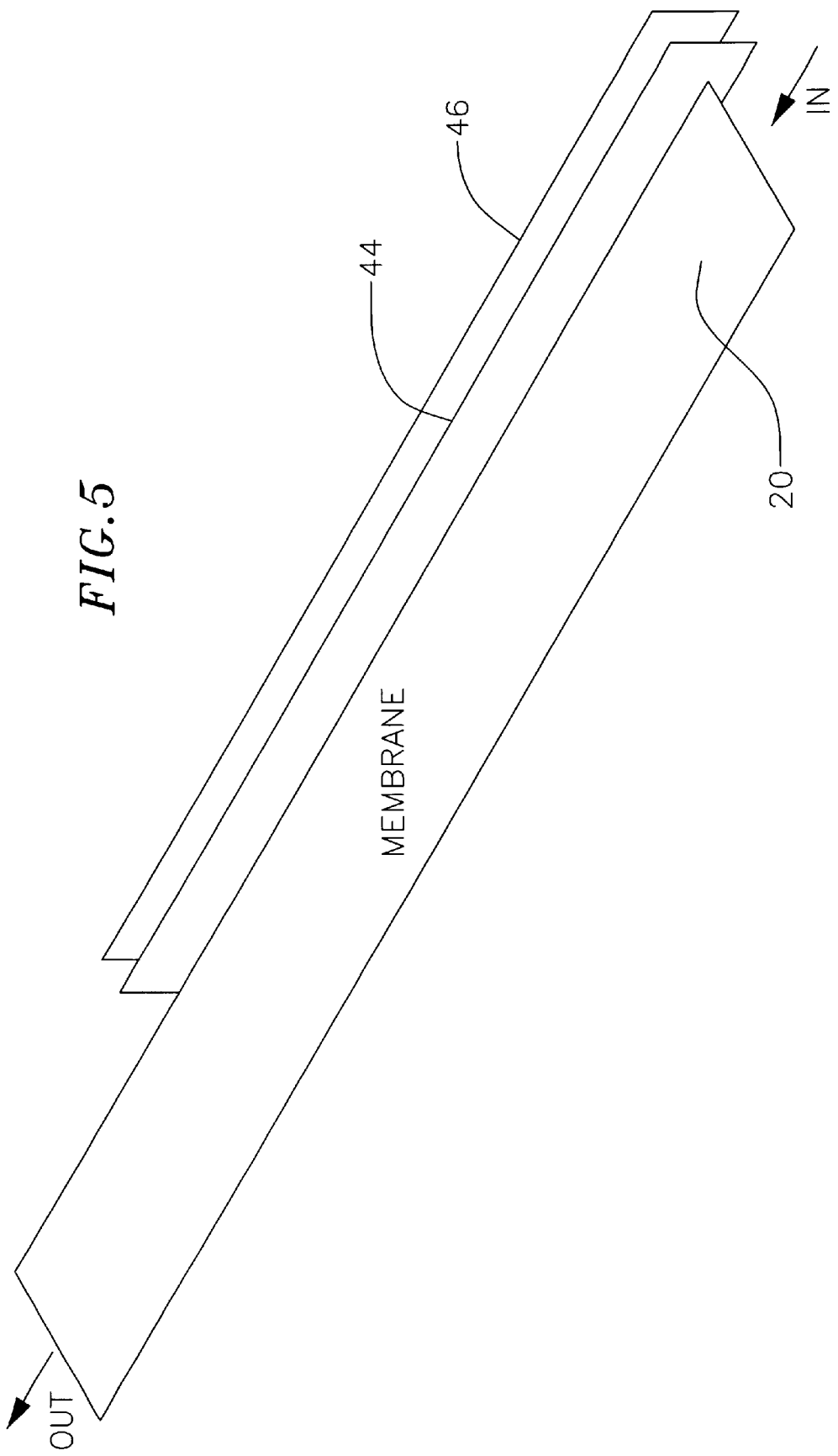

METHOD FOR RENDERING PVDF MEMBRANE HYDROPHILIC

CROSS-REFERENCE TO RELATED APPLICATION

This application claims priority of provisional application Serial No. 60/324,306, filed on Sep. 24, 2001, the disclosure of which is incorporated herein by reference.

BACKGROUND OF THE INVENTION

This invention relates to industrial filtration, and more particularly, to a method for rendering a PVDF filter membrane hydrophilic.

Microfiltration is used in the pharmaceutical, biotechnology, microelectronics, chemical and food industries to ensure product and process purity. In such applications, microporous membranes serve as filter media. These microporous membranes are formed from inert plastic materials. Typically, the pore size of the membrane is in the order of 0.1 to 5.0 microns, depending upon the particle size of the impurity. A typical microfilter used in industrial applications comprises a replaceable filter cartridge mounted in a housing, which has input and output ports in the process flow path. Such a filter cartridge has a pleated membrane arranged in a cylindrical configuration.

It is important that the filter be inert and produces no extractables that can corrupt the fluid being filtered. Polyvinyldifluoride (PVDF) can be formed into microporous sheets that have the described characteristics. Unfortunately, PVDF is hydrophobic. In order to use PVDF as a filter medium in a water based process, the PVDF must be rendered hydrophilic.

SUMMARY OF THE INVENTION

According to the invention, a microporous PVDF membrane is rendered hydrophilic without making it brittle, lowering its heat resistance during sterilization, or producing extractables by exposing the membrane to plasma under controlled conditions. Specifically, a microporous PVDF membrane is first coated with an appropriate hydrophilic monomer. After the monomer dries, the membrane is exposed to the plasma to polymerize the monomer and form a hydrophilic surface on the membrane. Any remaining monomer on the membrane is removed. Thereafter, the membrane is preferably pleated and incorporated in a filter cartridge.

A feature of the invention is the use of particular electrode configuration to expose the coated membrane to a plasma. Specifically, the electrodes lie in a vertical plane adjacent and parallel to the horizontal transport path of the membrane and outside the space between the electrodes. As a result, the membrane is only indirectly exposed to the plasma generated by the electrodes during transport.

BRIEF DESCRIPTION OF THE DRAWINGS

The features of a specific embodiment of the best mode contemplated of carrying out the invention are illustrated in the drawings, in which:

FIG. 1 is a schematic block diagram of a method incorporating the principles of the invention;

FIG. 2 is a schematic diagram of the step of applying a monomer to a membrane represented in FIG. 1;

FIGS. 3 and 4 are schematic diagrams of the step of exposing a membrane to plasma represented in FIG. 1;

FIG. 5 is a perspective view of the plasma generating electrodes depicted in FIGS. 3 and 4.

DETAILED DESCRIPTION OF THE SPECIFIC EMBODIMENT

Figure 6:
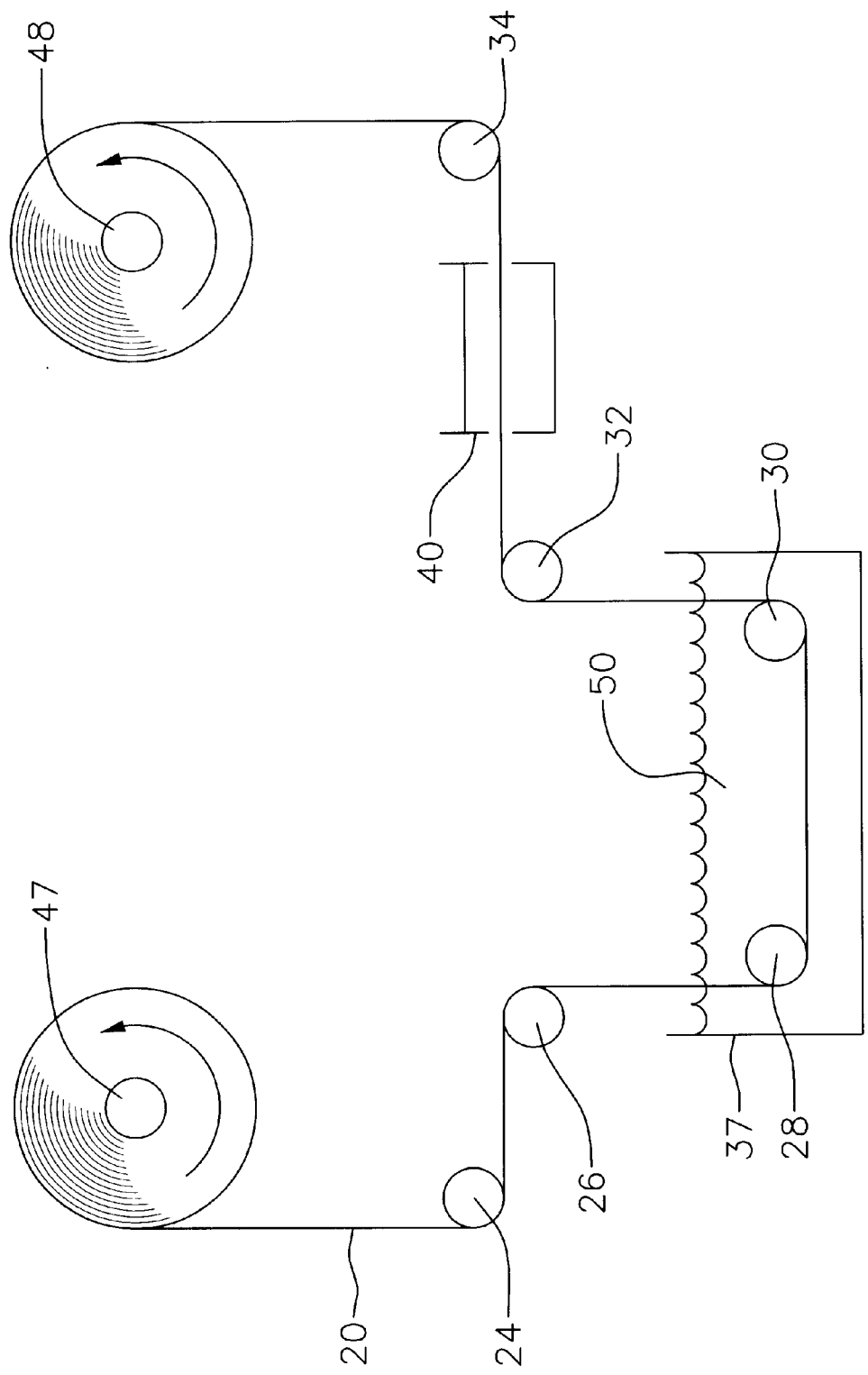
FIG. 6 is a schematic diagram of the step of removing remaining monomer from a membrane represented in FIG. 1.

A hydrophobic microporous sheet of PVDF, which is typically of the order of 12 to 24 inches wide is processed in 500-foot batches in the manner shown in FIG. 1. As represented by a block 10, a monomer is first applied to the sheet. As represented by a block 12, the sheet is then exposed to a plasma under controlled conditions to polymerize and fix the monomer. As represented by a block 14, any unfixed monomer remaining after exposure to the plasma is removed. As represented by a block 16, pleats are formed in the sheet after the remaining monomer is removed. As represented by a block 18, a filter cartridge is assembled, which incorporates the pleated sheet.

After the steps represented by blocks 10 and 14, the membrane is preferably dried before the next step is performed. Typically, the membrane sheet is stored in rolls of 500 to 1000 feet. In the course of each of steps 10, 12 and 14 the membrane sheet is unrolled for processing and then rolled up again for transport to the next stage of the process. Thus, part of the process is batch and part of the process is continuous.

Specifically, as shown in FIG. 2, a PVDF membrane sheet 20 is unwound from a supply reel 22. Membrane sheet 20 then moves along a path defined by a series of rollers 24, 26, 28, 25 30, 32 and 34 and is wound onto a take-up reel 36. Means not shown are provided to transport membrane sheet 20 from reel 22 to reel 36. Along the path, membrane sheet 20 passes through a hydrophilic monomer bath 38. By way of example, monomer bath 38 could comprise a mixture of polyethylene Glycol (200) Diacrylate (monomer), (4-(2-hydroxyethoxy) phenyl-2-hydroxymethylpropyl ketone (photoinitiator), and Triethyl citrate (plastisizer) dissolved in methyl alcohol. After leaving monomer bath 38, membrane sheet 20 passes through a dryer 40 which removes the solvent methyl alcohol by evaporation. Dryer 40 could, for example, comprise a pair of air impingement dryers blowing hot air on both sides of membrane sheet 20 through slots. This leaves a dry coating of the other ingredients of the bath. After membrane sheet 20 is dry, it is rolled onto take-up reel 36. In a typical embodiment, the transport speed of membrane sheet 20 and the length of dryer 40 are designed so membrane sheet 20 is resident in dryer 40 until it is dry, which depends on the amount of heat produced by dryer 40. It should be noted that membrane sheet 20 is in a dry state as it is stored on reel 22 and fed into bath 38. Since membrane sheet 20 does not carry any liquid into bath 38, it also does not dilute or change the concentration of bath 38 and therefore contributes to a more stable process.

After membrane sheet 20 is rolled onto reel 36, it is carried to an air tight chamber 42, as shown in FIGS. 3 and 4, and threaded along a horizontal transport path defined by guide rollers 43 and 45 onto a take up reel 47. Chamber 42 is evacuated to create a high vacuum. For example, chamber 42 could first be evaluated to a pressure below 40 mTorr. Then helium is introduced into chamber 42 to a pressure of about 450 mTorr and a plasma is generated in chamber 42. Instead of helium, it is possible that other inert gases might be used. Further, higher concentrations (pressure) of He could be used if heat resistance is not a consideration. To a point, higher He concentrations improve the flexibility.

To generate the plasma, a high radio frequency voltage generator (not shown) is connected to a pair of electrodes 44 and 46 to generate the polymerizing plasma in the space (direct electric field) between electrodes 44 and 46 and in the space (fringe electric field) around the exterior of electrodes 44 and 46. If the pressure in chamber 42 is too high, there is not enough energy available to ignite the a plasma field. A typical excitation frequency produced by the voltage generator is 13.57 MHz. Electrodes 44 and 46 lie in a vertical plane adjacent and parallel to the horizontal transport path of membrane sheet 20. If chamber 42 is metal, care must be taken to space electrodes 44 and 46 far enough from the walls of chamber to prevent arcing, e.g., at least twice the electrode spacing. As membrane sheet 20 moves along the transport path, it is exposed to the plasma to polymerize the monomer. The plasma intensity in the space through which membrane sheet 20 passes is as uniform as possible and has a sufficiently large intensity to polymerize the monomer coating without damaging the coating or making 20 membrane sheet brittle. Means not shown are provided to transport membrane sheet 20 from reel 36 to reel 47. Since membrane sheet 20 does not lie in the space between electrodes 44 and 46, but instead lies outside the space between electrodes 44 and 46, it is only indirectly exposed to the plasma generated by electrodes 44 and 46 during transport, which creates a relatively uniform plasma intensity in the space through which membrane sheet 20 passes. As a result, the surface of membrane sheet 20 is processed, i.e., polymerized, uniformly. The exposure time determined by the transport speed and the length of electrodes 44 and 46, is sufficient to fully polymerize the monomer coating, while maintaining "good results", as that term is defined below. If the exposure time is too long, the polymer coating on the surface of membrane sheet 20 may become damaged. If the exposure time is too short, the polymer coating on the surface of membrane sheet 20 is not fully polymerized. The perforations in electrodes 44 and 46 help dissipate heat and better permit the charged particles of the plasma to circulate into the space around the outside of electrodes 44 and 46 along the transport path where they can effectively react with membrane sheet 20 in an environment of low particle impact energy. This tends to minimize damage to the polymerized hydrophilic surface of the membrane. The plasma intensity depends in part on the plasma exposure time of membrane sheet 20. In a typical embodiment, electrodes 44 and 46 would be approximately 8 feet long, 4 inches high, and 1½ inches apart and the distance between electrode 44 and the edge of membrane sheet 20 would be two inches. If membrane sheet 20 is to be subjected to high temperatures, as for example result from heat sterilization, an important consideration is the heat resistance of membrane sheet 20 to a reversion to a hydrophobic state during the sterilization. To summarize, the hydrophilic monomer coating is polymerized to form a permanent hydrophilic coating on the surface of membrane sheet 20 without making it brittle or reducing its heat resistance if subjected to high temperatures.

After membrane sheet 20 is rolled onto reel 47, it is transported to the equipment shown in FIG. 6, which is the same as that shown in FIG. 2, except for the contents of tank 37, so the same reference numerals are used to identify like components. Tank 37 contains a pure methyl alcohol bath 50, which removes any excess or uncured monomer on the surface of membrane sheet 20. Membrane sheet 20 moves along a transport path defined by rollers 24, 26, 28, 30, 32 and 34, and is wound onto a take-up reel 48. Means not shown are provided to transport membrane sheet 20 from reel 47 to reel 48 Along the transport path membrane sheet is immersed in bath 50 and passes through dryer 40

After rewinding onto take-up reel 48, membrane sheet 20 is cut into pieces for the purpose of forming pleats as represented in block 16. The pleating is performed by means of well-known manufacturing techniques. Thereafter, the pleats are assembled into filter cartridges in accordance with well known manufacturing techniques.

The following table sets forth a number of operating parameters and their effect on the processed membrane sheet, i.e, the resulting characteristics of the processed membrane sheet.

| Pore Size Microns | Monomer % | Photoiniator % | Plastisizer % | R.F. Power Watts | Heat Resistance | Hydrophilicity | Flexibility | Case |
|---|---|---|---|---|---|---|---|---|
| 0.1 | 15% | 5% | 10% | 1500 | Good | Good | Good | 1 |
| 0.1 | 5% | 5% | 5% | 1500 | Good | Good | Brittle | 2 |
| 0.1 | 15% | 0% | 5% | 1500 | Low | Bad | Good | 3 |
| 0.1 | 15% | 5% | 5% | 1500 | Good | Good | Good | 4 |
| 0.1 | 10% | 3% | 3% | 1500 | Low | Marginal | Brittle | 5 |
| 0.1 | 10% | 0% | 3% | 1500 | Very Low | Marginal | Brittle | 6 |
| 0.1 | 15% | 5% | 5% | 1250 | Good | Good | Good | 7 |
| 0.2 | 15% | 5% | 5% | 800 | Good | Good | Good | 8 |
| 0.2 | 15% | 0% | 5% | 800 | Low | Marginal | Brittle | 9 |
| 0.2 | 15% | 5% | 5% | 1000 | Good | Good | Good | 10 |
| 0.4 | 15% | 5% | 5% | 800 | Good | Good | Good | 11 |
| 0.6 | 15% | 5% | 5% | 800 | Good | Good | Good | 12 |

From the above data it can be seen that good results are obtained under controlled operating conditions with the 5 electrode configuration shown in FIGS. 3, 4, and 5, e.g., the conditions set forth in cases 1, 4, 7, 8, 10, 11, and 12 above. Specifically, the desired, e.g., "good results", are that the treated membrane be hydrophilic, flexible enough so it can be pleated, i.e., not brittle or rigid, and temperature resistant at sterilization temperatures, e.g., resistant to temperatures in the range of 121 to 135 degrees Calvin without reverting to a hydrophobic state. There could be a tradeoff of operating parameters to achieve characteristics desired for a particular application, e.g., the parameters could be chosen to very good flexibility, but poor heat resistance. Among the good results in the table, the best results occur in Cases 8, 10, 11, and 12. Other combinations of operating parameters or variations from the operating parameters based on the inventors' teachings above might also yield such good results without undue experimentation. For example:

1) The power could be reduced to as little as 200 Watts with good results. The tradeoff is processing time because the membrane transport speed then has to be substantially decreased. Below a 200-Watt level, it becomes difficult to maintain a uniform plasma without further decreasing the vacuum (increasing the pressure).

2) It is possible that the percentage of monomer, plastisizer, and/or photoiniator can be reduced if the power is decreased, and possibly the helium is increased.

3) Although a limited number of pore sizes appear in the above table, the invention can be used to hydrophilize membranes having pore sizes up to 0.6 microns and possibly larger. Commercial applications in the field of the invention use pore sizes up to about 5 microns.

4) If the membrane sheet is not going to be subjected to high temperatures, the heat resistance is not a factor.

5) The helium pressure in chamber 42 for all the above operating parameters is 450 mTorr. A higher vacuum (lower pressure) would also yield good flexibility, but would probably be more expensive.

In this specification, in keeping with the parlance of the industrial filter field, the term "hydrophilic" refers to the ability of the membrane to completely wet with water in less than one second when immersed in water.

To summarize, peripheral brittleness is alleviated by selecting a proper electrode configuration. In one embodiment the electrode surface is decreased, e.g., to approximately three inches by eight feet, the electrodes are placed in a vertical plane, and the membrane is moved adjacent to the electrodes, which prevents electrode "hot spots" above the electrodes. Plasma concentration or plasma abundance correlates to power applied to the electrode. The strength of the PVDF membrane and other physical properties such as elasticity and elongation are dependent on plasma concentration. In one plastisizer is added to the bath to maintain membrane flexibility. A photoinitiator is added to the bath to maintain monomer/polymer grafting and to maintain hydrophilicity after exposure to autoclaving cycles @ 125° C. For every pore size membrane there is ideal condition in regard to plasma parameters. Over-exposure to plasma will burn off the coating leaving the membrane hydrophobic and brittle. Under-exposure does not graft coating to the membrane sufficiently to maintain heat stability.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example a different electrode configuration could be used under appropriate controlled operating conditions or a different set of controlled operating conditions could be used with the disclosed electrode configuration to achieve good results.

What is claimed is:

1. A method for making a porous hydrophilic filter membrane comprising the steps of:

coating the surface of a porous PVDF membrane with a solution of a monomer, a plastisizer, and a photoinitiator, drying the surface of the membrane; and exposing the surface of the membrane to a plasma for a time sufficient to hydrophilize the membrane without making the membrane brittle.

2. The method of claim 1, in which the coating step comprises applying the solution to the membrane with a roller.

3. The method of claim 2, in which the solution has a methyl alcohol solvent.

4. The method of claim 3, in which the exposing step comprises moving the membrane along a transport path that is parallel to a pair of elongated electrodes.

5. The method of claim 3, in which the exposing step comprises moving the membrane along a transport path that is parallel to a pair of horizontally elongated electrodes, the surface of the electrodes being perpendicular to the surface of the membrane.

6. The method of claim 3, in which the exposing step comprises moving the membrane along a transport path that is parallel to a pair of horizontally elongated, perforated electrodes, the surface of the electrodes being perpendicular to the surface of the membrane.

7. The method of claim 1, in which the surface of the membrane is exposed to the plasma in an inert atmosphere.

8. The method of claim 1, in which the surface of the membrane is exposed to the plasma in a helium atmosphere.

9. A method for making filter cartridge comprising the steps of:

coating the surface of a porous PVDF membrane with a monomer, a plastisizer, and a photoinitiator in solution;

drying the surface of the membrane;

exposing the surface of the membrane to a plasma for a time sufficient to hydrophilize the membrane without making the membrane brittle;

folding the membrane to form pleats; and inserting the folded membrane in a housing.

10. The method of claim 9, in which the surface of the membrane is exposed to the plasma in an inert atmosphere.

11. A method for making a porous hydrophilic filter membrane comprising the steps of:

coating the surface of a porous PVDF membrane with a monomer; and exposing the surface of the membrane to a plasma by transporting the membrane parallel to a pair of plasma-generating electrodes to hydrophilize the membrane without making the membrane brittle.

12. The method of claim 11, in which the surface of the membrane is exposed to the plasma in an inert atmosphere.

* * * * *